United States Patent [19]

Koshimo

[11] Patent Number: 4,765,200
[45] Date of Patent: Aug. 23, 1988

[54] STEPLESS SPEED-CHANGE POWER TRANSMISSION FOR VEHICLE

[75] Inventor: Masahiko Koshimo, Osaka, Japan

[73] Assignee: Kabushiki Kaisha Daikin Seisakusho, Osaka, Japan

[21] Appl. No.: 826,037

[22] Filed: Feb. 4, 1986

[30] Foreign Application Priority Data

Feb. 5, 1985 [JP] Japan .................. 60-20380

[51] Int. Cl.[4] .............. F16H 47/06; F16H 45/02; F16D 33/16; F16D 43/18
[52] U.S. Cl. .................... 74/731; 192/3.25; 192/3.26; 192/3.31; 192/3.33; 192/105 BA; 74/689
[58] Field of Search ............... 74/731, 689; 192/3.21, 192/3.25, 3.26, 3.28, 3.31, 3.33, 103 B, 105 BA

[56] References Cited

U.S. PATENT DOCUMENTS

| | | | |
|---|---|---|---|
| 2,019,745 | 11/1935 | Swennes | 192/3.26 |
| 2,129,366 | 9/1938 | Swennes | 192/3.25 X |
| 2,627,189 | 2/1953 | McFarland | 192/3.26 X |
| 2,640,572 | 6/1953 | O'Brien | 192/3.26 X |
| 2,882,751 | 4/1959 | Kelley | 192/3.33 X |
| 3,478,621 | 11/1969 | Johnson et al. | 192/3.33 X |
| 3,893,551 | 7/1975 | Ahlen | 192/3.33 |
| 4,004,417 | 1/1977 | Woody et al. | 192/3.31 X |
| 4,049,094 | 9/1977 | Polomski et al. | 192/105 BA X |
| 4,113,075 | 9/1978 | Walker | 192/3.31 |
| 4,181,203 | 1/1980 | Malloy | 192/3.31 X |
| 4,226,309 | 10/1980 | Siliberschlag | 192/3.31 |
| 4,305,493 | 12/1981 | Silberschlag | 192/105 BA |
| 4,383,596 | 5/1983 | Jackel | 192/3.31 |
| 4,455,888 | 6/1984 | Wayman et al. | 74/689 |
| 4,478,105 | 10/1984 | Yamamura et al. | 74/731 X |
| 4,549,447 | 10/1985 | Sakakibara | 74/689 |
| 4,601,676 | 7/1986 | Tojima et al. | 192/106.2 |
| 4,673,071 | 6/1987 | Moroto et al. | 192/3.21 |

FOREIGN PATENT DOCUMENTS 2121489 12/1983 United Kingdom ............... 192/3.25

Primary Examiner—Leslie A. Braun
Assistant Examiner—Richard M. Lorence
Attorney, Agent, or Firm—Armstrong, Nikaido, Marmelstein & Kubovcik

[57] ABSTRACT

A stepless speed-change power transmission for a vehicle having a fluid coupling, a forward/backward change-over mechanism coupled to a rear stage of the fluid coupling and a stepless speed changer coupled to a rear stage of the forward/backward change-over mechanism. The fluid coupling has a clutch for selectively coupling an engine driven drive plate with the pump wheel of the fluid coupling, when a vehicle is operated to drive, between the drive plate transmitting power from the engine to the fluid coupling. A turbine wheel facing the pump wheel is interconnected through a turbine hub to an output shaft for transmitting power to the forward/backward change-over mechanism.

6 Claims, 5 Drawing Sheets

STEPLESS SPEED-CHANGE POWER TRANSMISSION FOR VEHICLE

BACKGROUND OF THE INVENTION

1. Industrial Useful Field

This invention relates to a stepless speed-change power transmission for vehicle having a fluid coupling, a forward/backward change-over mechanism coupled to a rear stage of the fluid coupling and a stepless speed changer coupled to a rear stage of the forward/backward change-over mechanism.

2. Prior Art and Its Problem

Dry centrifugal clutches or a hydraulic clutch have have heretofore been proposed for stepless speed-change power transmissions. More recently in, (Unexamined Japanese patent publication No. 57-140956) a fluid coupling equipped with a lock-up device or a torque converter is proposed, which provides smooth acceleration and improved fuel consumption.

However, such fluid coupling or torque converter has a problem that, when the vehicle is stopped and the engine continues running, the engine power is transmitted to the speed changer side and can cause an unexpected sudden acceleration of the vehicle, for example, when the engine rotation rises sharply during warm-up. This phenomenon is commonly referred to as creep.

To overcome such creep, an automatic transmission incorporating a clutch in the speed changer at the rear stage of the fluid coupling has been proposed. However, a transmission equipping a mechanism for preventing such creep phenomenon in the fluid coupling has not been developed yet.

OBJECT OF THE INVENTION

An object of this invention is to provide a stepless speed-change power transmission for vehicle, in which a mechanism for preventing creep phenomenon is provided in the fluid coupling.

COMPOSITION OF THE INVENTION

(1) Technical measure

In a stepless speed-change power transmission for vehicle having a fluid coupling, a forward/backward change-over mechanism coupled to a rear stage of the fluid coupling, and a stepless speed changer coupled to a rear stage of the forward/backward change-over mechanism; a clutch element, which selectively couples a drive plate with a pump wheel only when a vehicle is operated to drive, is installed between the drive plate transmitting a power from an engine to the pump wheel of the fluid coupling; a turbine wheel facing on said pump wheel is interconnected through a turbine hub to an output shaft; and the power is transmitted from this output shaft to said forward/backward change-over mechanism.

(2) Function

The clutch element prevents the engine power from being inadvertently transmitted to the turbine wheel for avoiding the creep phenomenon.

DETAILED DESCRIPTION OF THE INVENTION

Embodiments (1) First embodiment

A stepless speed-change power transmission for use in a vehicle according to the present invention will be described hereunder with reference to FIG. 1 and FIG. 2.

Figure 1:
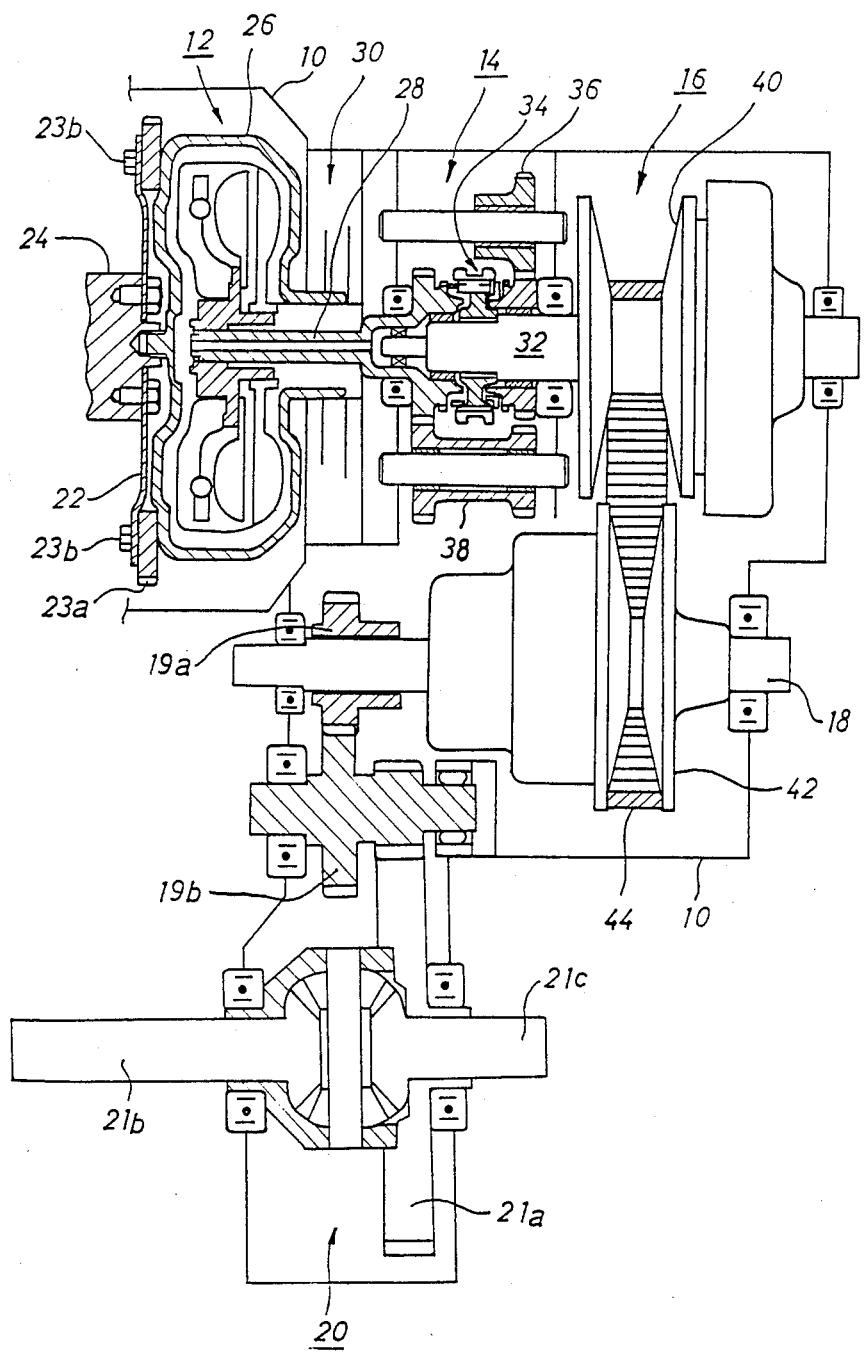
FIG. 1 is a schematic structural view of a stepless speed-change power transmission according to the present invention.

FIG. 1 shows a general structural view of the entire transmission, and in FIG. 1, 10 is a housing. A fluid coupling 12 is incorporated in an engine side end portion of the housing 10, and a stepless speed changer 16 is provided at a rear stage of the fluid coupling, 12 through a forward/backward change-over mechanism 14. Further, power is transmitted from a counter shaft 18 of the stepless speed changer 16 through an output gear 19a and a counter gear 19b to an input gear 21a of a differential mechanism 20, and outputted from the differential mechanism 20 to both left and right axles 21b and 21c.

An engine shaft 24 is coupled to a drive plate 22 of fluid coupling 12, and a starter ring gear 23a is formed on an outer periphery of the drive plate 22 and bolts 23b are fitted thereto. The engine power supplied from the drive plate 22 is transmitted to an external shell element 26 of fluid coupling 12, and transmitted intermittently from an output shaft 28 to the forward/backward change-over mechanism 14 by means of the fluid coupling which will be described later in details. At the same time, the power drives a gear pump 30 disposed between the fluid coupling 12 and the forward/backward mechanism 14 to control a flow of pressurized oil by means of a well-known control valve, not shown for example a spool valve.

The gear pump 30 pumps working oil into fluid coupling 12. The control valve controls the flow of working oil by the driver's range-shifting operation. The output shaft 28 is interconnected to a main shaft 32. A synchronizer 34 of the forward/backward change-over mechanism 14 is provided on the main shaft 32. The synchronizer 34 can selectively engage a forward gear 36 or a backward gear 38 by the driver's range-shifting operation.

A main pulley 40 of the stepless speed-changer 16 is fixed to the main shaft 32, and a V-belt 44 is wound around the main pulley 40 and a sub-pulley 42 on the counter shaft 18. The main pulley 40 and V-belt 44 have a well-known stepless speed-change function wherein a contact surface radius of the V-belt 44 is adjusted according to a vehicle speed.

The stepless speed changer 16 is not necessarily limited to the construction utilizing the above-mentioned V-belt 44, but may be a stepless speed changer of a troidal type or a traction-drive type.

Next, the construction of the fluid coupling 12 will be described hereunder with reference to FIG. 2.

Figure 2:
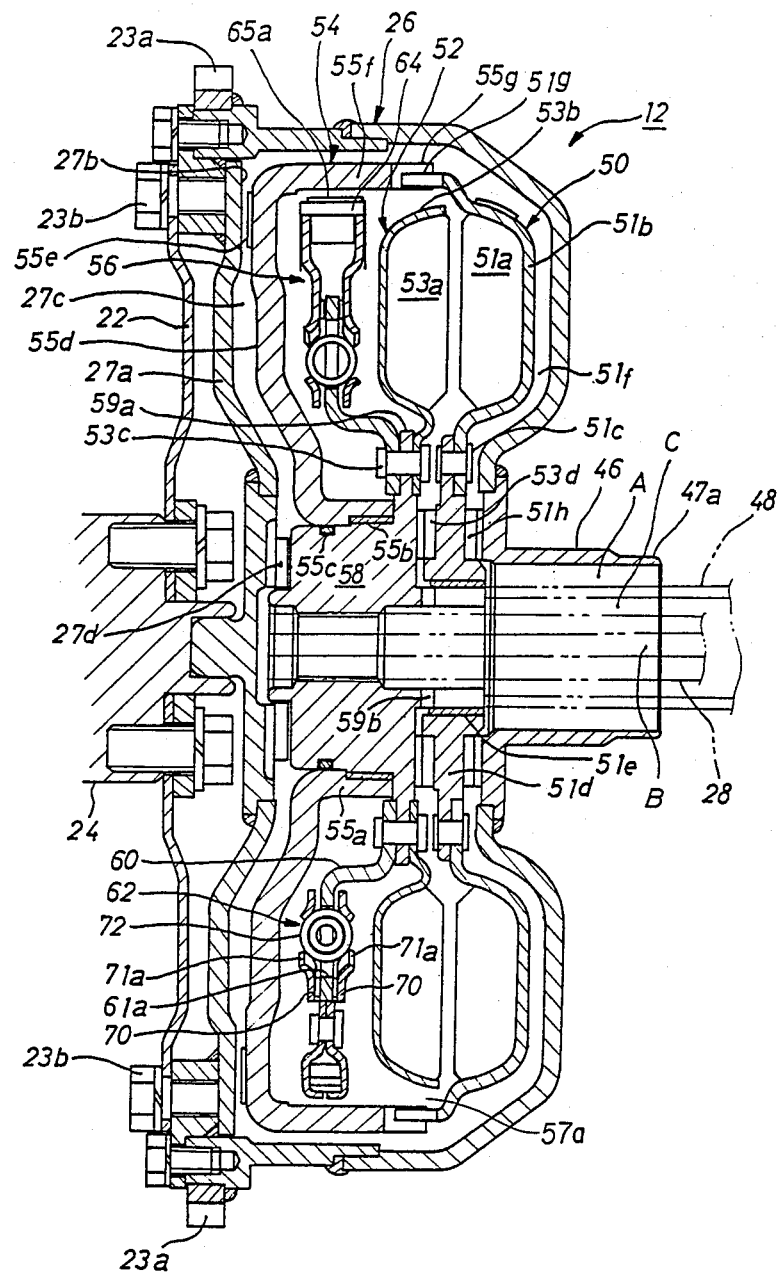
FIG. 2 is a vertical sectional view showing a fluid coupling.

In FIG. 2, the external shell element 26 of fluid coupling 12 has an approximately annular cross section at its portion surrounding the output shaft 28. Drive plate 22 is fastened by the bolts 23b to a left end face, in FIG. 2, of the external shell element 26. A cylindrical sleeve 46 is held to a right end portion of the external shell element 26, and an output section 47a for driving gear pump 30 is formed on the sleeve 46. A cylindrical shaft 48 connected to the housing 10 is provided at an internal side of the sleeve 46, a working oil passage A is formed between an internal face of the sleeve 46 and the external face of the cylindrical shaft 48, and a working oil passage C is formed between an internal face of the cylindrical shaft 48 and an external face of the output shaft 28. These working oil passages A and C are opened and closed by the not-shown well-known control valve (such as the spool valve etc.) as described above for controlling the flow of oil from gear pump 30 through such passages.

A pump wheel 50, a turbine wheel 52, a piston 54 (clutch element) and a centrifugal lock-up clutch 56 etc. are housed in the external shell element 26.

The pump wheel 50 is composed of a pump vane 51a and a pump shell 51b, a radially inner periphery of the pump shell 51b is fastened by a rivet 51c to a pump hub 51d, and the pump hub 51d is rotatably supported through a bearing 51e to a turbine hub 58. A chamber 51f is formed between the pump shell 51b and the external shell element 26, and the chamber 51f is connected to the working oil passage A through a passage 51h.

The turbine wheel 52 is so disposed as to face on the pump wheel 50, and the turbine wheel is formed of a turbine vane 53a and a turbine shell 53b. A radially inner periphery of the turbine shell 53b is fastened by a rivet 53c to a right side face of a flange 59a of the turbine hub 58. A passage 53d is formed between the flange 59a and the pump hub 51d, and the passage 53d is connected to working oil passage C through a passage 59b.

A slidable, piston 54 is provided between an input section 27a of the external shell element 26 and the pump wheel 50. An inner peripheral flange 55a of the piston 54 is held axially slidably to an outer peripheral face of the turbine hub 58 through a bush 55b and an oil seal 55c. A facing 55e contacting with a contact face 27b of the input section 27a is lined on an end face 55d of the piston 54. An outer peripheral flange 55f of the piston 54 bends toward an outside of the pump wheel 50, and a dog tooth 55g of the outer peripheral flange 55f meshes with a dog tooth 51g of the pump shell 51b in such a manner that they are permitted to slide in the axial direction of the piston 54.

A chamber 27c is formed between the piston 54 and the input section 27a, and the chamber 27c is connected to the working oil passage B formed in the output shaft 28 through a passage 27d. The passage B is controlled to be opened and closed by the control valve controlling the output of gear pump 30.

The centrifugal lock-up clutch 56 is housed in a chamber 57a surrounded by the pump wheel 50 and the piston 54. The centrifugal lock-up clutch 56 consists of an output hub 60, a damper mechanism 62, a clutch shoe 64 etc. A radially inner peripheral part of the output hub 60 is fastened together with the turbine shell 53b by the rivet 53c to a right end face of the turbine hub 58.

The damper mechanism consists of a hole 61a of the output hub 60, holes 71a formed on two side plates 70 and a torsion spring 72 compressively installed in between the holes 61a and 71a, having a function to absorb a torque fluctuation at the time of locking-up of the centrifugal clutch. The clutch shoe 64 which is freely contractible and expandable in its radial direction depending on a centrifugal force is provided at an outer peripheral edge of the side plate 70. A facing 65a contacting with an internal face of the outer peripheral flange 55f is lined on the clutch shoe 64.

Figure 3:
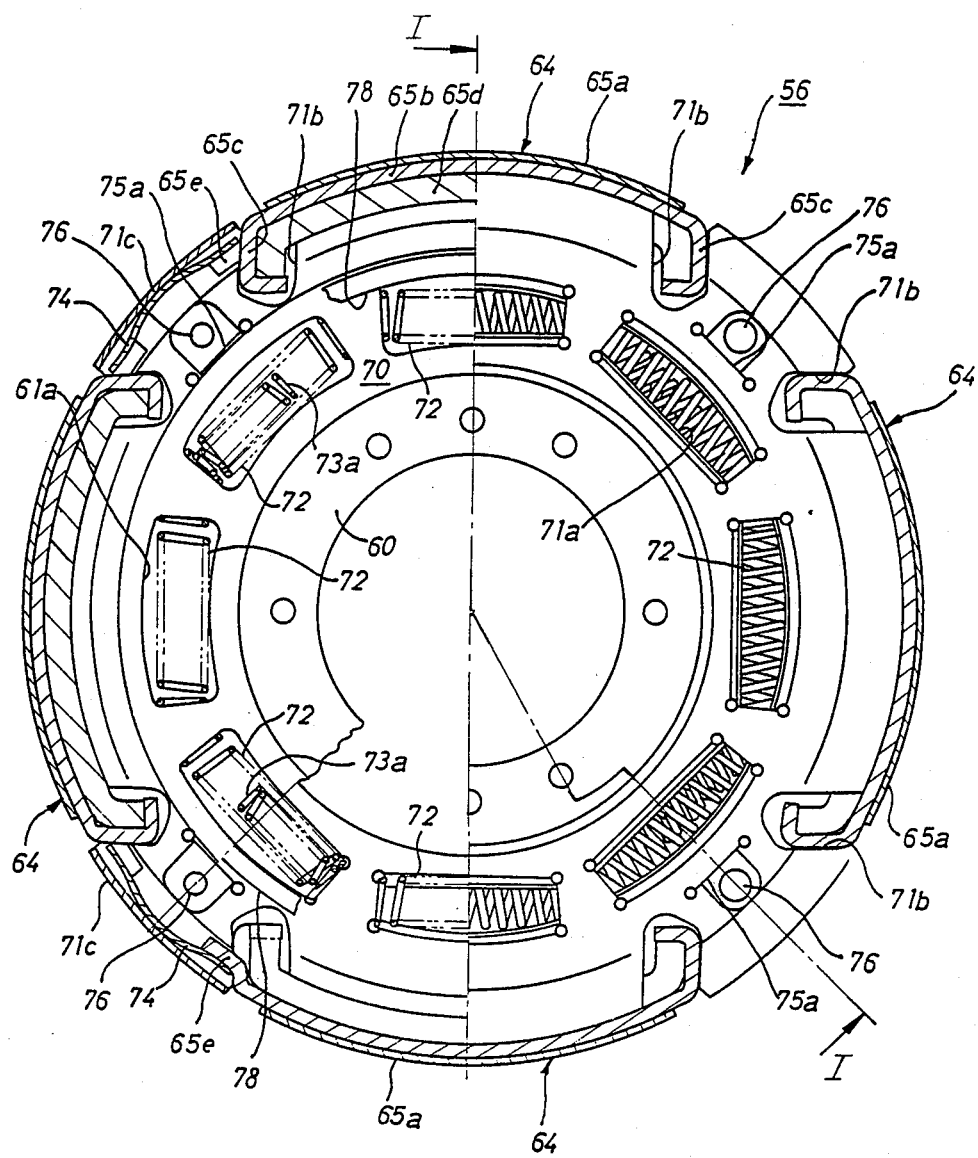
FIG. 3 is a plan view of a centrifugal lock-up clutch.

The torsion spring 72 is disposed, as shown in FIG. 3, at eight circumferential places for example with circumferentially equal spaces left therebetween. Torsion springs 73a of small diameter are disposed concentrically in every other torsion spring 72.

Further, the clutch shoes 64 are disposed on four places, for example, of a radially outer peripheral part of the side plate 70 with equal spaces left therebetween. The clutch shoe 64 is a member formed of an outer peripheral section 65b and a guide section 65c by bending a band steel plate, and a weight 65d is fitted integrally to its internal side by means of "crimp work" for example. The outer peripheral section 65b is formed into a circular arc shape approximately concentric to an outer peripheral edge of the side plate 70, and the facing 65a is lined on the outer peripheral section 65b. A projection 65e extending to a side direction is formed on the guide section 65c by means of a "press work" for example. The guide section 65c is held by a groove 71b of the side plate 70 in such a manner that it can freely slide in the radial direction of the side plate 70. The centrifugal lock-up clutch 56 of FIG. 2 shows a sectional view taken on a line I—I of FIG. 3.

A retaining portion 71c is formed on the side plate 70 between adjoining clutch shoes 64, a leaf spring 74 is compressively installed in between an internal face of the retaining portion 71c and a projection 65e, and a radial position of the clutch shoe 64 is determined by a spring force of the leaf spring 74.

A cut section 75a is provided on the side plate 70 at an internal side of the leaf spring 74, the side plate 70 is deformed starting from this cut section 75a by means of a press work etc. for example, and the side plates 70 are fastened with rivets 76 by making the two side plates 70 come closely into contact as shown in FIG. 2. The rivets 76 are provided at four circumferential places, for example.

Further, a wave spring 78 for generating a hysteresis torque is interposed between the output shaft 60 and the side plate 70.

The operation of the transmission will be described hereunder. Flows of working oil through the working oil passages A, B and C are changed by means of the gear pump 30 and the not-shown control valve through the driver's range-shifting operation, and a difference is created in pressures between the chamber 57a and the chamber 27c to make the piston 54 slide in its axial direction. Thus the power transmitted from the input portion 27a to the pump wheel 50 is selectively passed or interrupted. Namely, the power is transmitted to the pump wheel 50 when the piston 54 is switched to ON (engaged) and it is not transmitted to the pump 50 when the piston 54 is switched to OFF (disengaged).

First, when the engine runs at idle, the vehicle is stopped or the transmission is shifted to forward or backward, the piston 54 does not transmit power to pump 50 of fluid coupling 12. iN this condition, passage B is connected to pump 30 by the control valve, and oil passages A and C are connected to a fluid tank, not shown, in pump 30. Therefore, fluid is pumped from passage B and discharged from passages A and C. Since a pressure in the chamber 27c becomes higher than a pressure in the chamber 57a under this state, a pressure difference between the chamber 27c and the chamber 57a makes the piston 54 slide toward the pump wheel 50 so that the facing 55e leaves the contact face 27b. Accordingly, the piston 54 is switched to OFF and a torque from the engine is transmitted only to the external shell element 26 and the gear pump 30 so that a torque other than a slight drag torque is not transmitted to the output shaft 28.

Therefore, the generation of creep phenomenon is avoided to eliminate possibilities of the unexpected sudden acceleration of the vehicle during warm-up run and vibrations generated during idle run of the engine.

Next, when starting or accelerating the vehicle, the control valve is operated to change position such that hydraulic fluid is pumped from oil passage C through passage 53d into chamber 57a, and oil is discharged from passages A and B, through the driver's range-shifting operation of the control valve to either D (drive) of R (reverse) range. Since the pressure in the chamber 57a becomes higher than the pressure in the chamber 27c under this state, the piston slides toward the input portion 27a to make the facing 55e press on the contact face 27b.

Therefore, the piston 54 is switched to ON, the engine torque is transmitted from the external shell element 26 through the piston 54 to the pump turbine wheel 50, and further from the turbine wheel 52 to the output shaft 28. The power from the output shaft 28 is transmitted through the forward/backward change-over mechanism 14 to the stepless speed changer 16 and transmitted to the axles 21b and 21c to drive the vehicle.

As the vehicle is gradually accelerated; the turbine hub 58 increases its rotation speed, a centrigual force applied on the weight 65d of the centrifugal lock-up clutch 56 is increased, the clutch shoe 64 moves outward against the spring force of the leaf spring 74 due to the centrifugal force, and facing 65a of the clutch shoe 64 contacts the internal face of the outer peripheral flange 55f to cause a so-called lock-up action.

Under this state the centrifugal lock-up clutch 56 contributes to the transmission of the engine torque, and the power inputted in the external shell element 26 is transmitted through two routes: a route through the pump wheel 50 and the turbine wheel 52 and a route through the centrifugal lock-up clutch 56.

When the vehicle speed rises further, the pressing force of the facing 65a on the outer peripheral flange 55f is increased, and as the speed increases the piston 54 is coupled directly with the turbine hub 58 through the centrifugal lock-up clutch 56. Under this state the engine torque is transmitted to the output shaft only by the centrifugal lock-up clutch 56 without passing through the pump wheel 50 and the turbine wheel 52.

Since the damper mechanism 62 is provided in the centrifugal lock-up clutch 56, shocks at the time of engaging and disengaging the centrifugal lock-up clutch 56 and torque fluctuation of engine are absorbed by the torsion spring 72 so that a ride-comfort of the vehicle can be maintained at a good level.

Effect of the Invention

As described above, in the stepless speed-change power transmission for use in a vehicle of this invention having the fluid coupling, the forward/backward change-over mechanism coupled to the rear stage of the fluid coupling, and the stepless speed changer coupled to the rear stage of the forward/backward change-over mechanism; the clutch element, which selectively couples the drive plate with the pump wheel only when the vehicle is operated to drive, is installed between the drive plate transmitting the power from the engine to the pump wheel of the fluid coupling; the turbine wheel facing on the pump wheel is interconnected through the turbine hub to the output shaft; and the power is transmitted from this output shaft to the forward/backward change-over mechanism. Therefore the following advantages are obtained.

First, the power from the engine is transmitted to the pump wheel 50 only when the vehicle is operated to be driveable (the gear pump 30 and the control valve are shifted to a driving condition) by means of the piston 54, so that the creep phenomenon is not generated and the possibilities of unexpected sudden acceleration of vehicle during its warm-up run and vibrations generated during the idle run of the engine are eliminated.

Owing to the elimination of the creep phenomenon, the construction of the forward/backward change-over mechanism 14 can be simplified and engine load at the time of idling is minimized to provide improved fuel consumption.

Moreover, since the piston 54 is incorporated in the acceleration clutch 54, the whole structure become more simplified and small in size compared to the case where the clutch is added to the forward/backward change-over mechanism 14 or the stepless speed changer 16. Furthermore, in accelerating the vehicle, the engine power is transmitted through the pump wheel 50 and the turbine wheel 52 of fluid coupling 12, so that a smooth acceleration is obtained.

Other Embodiments (2) Second embodiment

Figure 4:
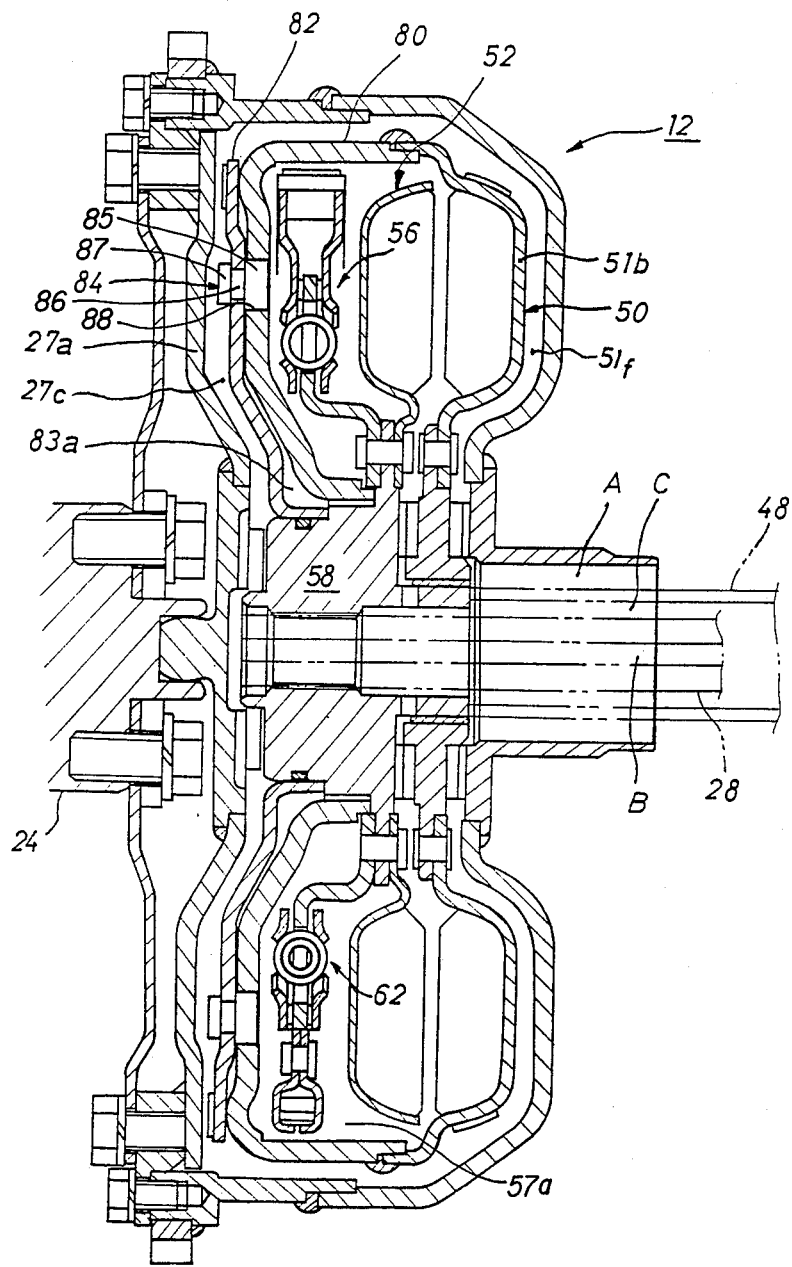
FIG. 4 and FIG. 5 are vertical sectional views showing other embodiments of the fluid coupling.

FIG. 4 shows an embodiment in which the clutch element is composed of a drum 80, a clutch plate 82 etc. In FIG. 4, an outer peripheral portion of the drum 80 is welded to a pump shell 51b. A freely slidable clutch plate 82 is provided at the input portion 27a side of the drum 80, and the clutch plate 82 is held by a pin, generally designated, having a body portion 85, a reduced portion 86 and a head 87. Pin 84 is fixed, at reduced portion 86, by head 87 and body portion 85, to clutch 82 and is slidable in its axial direction at body portion 85 in through hole 88 of drum 80. A chamber 83a is formed between the drum 80 and the clutch plate 82.

In this second embodiment, when the pressure in the chamber 27c is reduced by discharging the working oil from the working oil passage B, a pressure difference between the chamber 83a and the chamber 27c exerts a force on the clutch plate 82 to make the clutch plate 82 slide toward the input portion 27a. When the facing 55e of the clutch plate 82 contacts with the contact face 27b, a flow of working oil into the chamber 27c is obstructed to further reduce the pressure of the chamber 27c and conversely raise the pressure of the chamber 83a so that the clutch plate 82 is pressed on the contact face 27b with a large pressing force to be switched to ON.

Consequently, since a mass of the sliding clutch plate 82 in the second embodiment is smaller than the in the first embodiment the, response characteristics of ON and OFF switching for the clutch plate 82 are improved.

Further, the dog clutch is not used, in contrast to the embodiment of FIG. 1, so that chattering sounds of the dog tooth are eliminated and avoid generation of abnormal sound.

Moreover, since the clutch plate 82 can be switched to OFF even during running of the vehicle, the fuel consumption can be reduced by shifting the transmission to a neutral position at the time, for example, of reducing vehicle speed during running of the vehicle.

(2) Third embodiment

Figure 5:
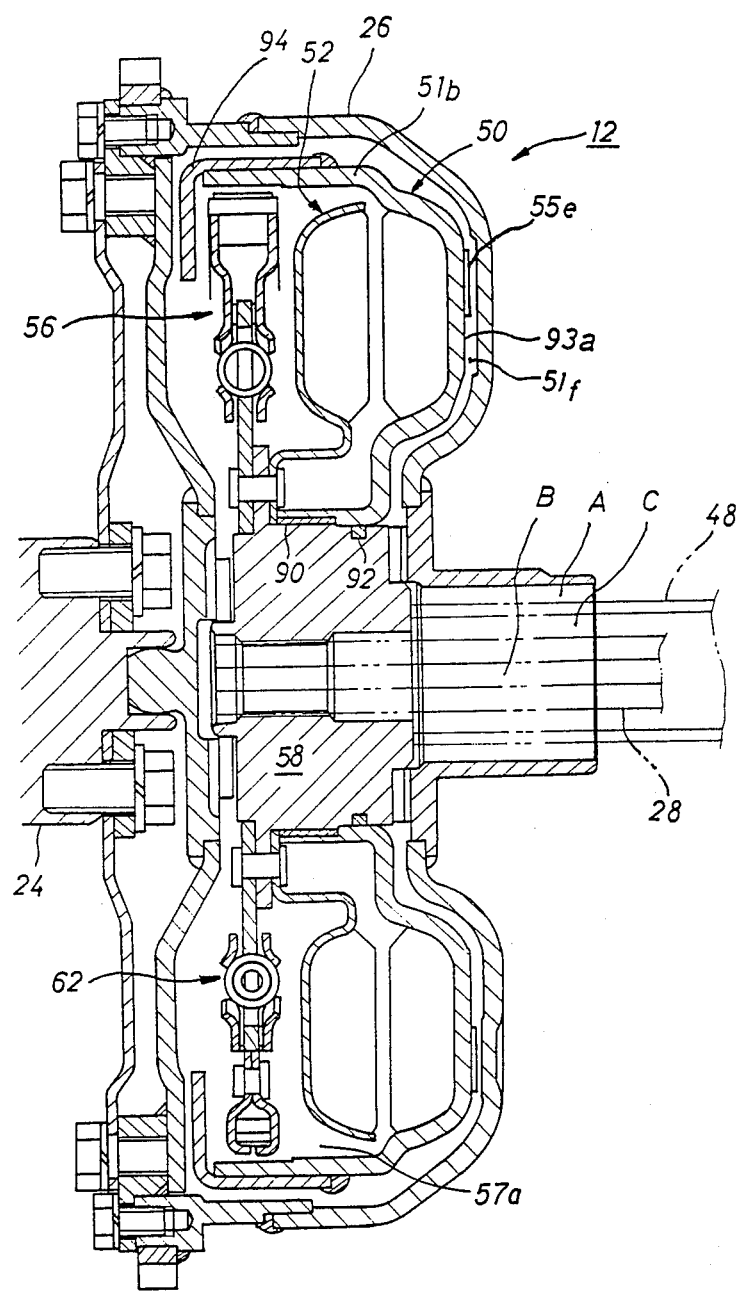

The third embodiment, FIG. 5, shows pump shell 51b of the pump wheel 50 used for the clutch element. In FIG. 5, the pump shell 51b is installed axially slidably on an outer peripheral surface of the turbine hub 58 through a bush 90 and an oil seal 92. The facing 55e is lined on an end face 93a of the pump shell 51b, and an annular cap 94 for preventing deformation caused by centrifugal force is welded to an outer peripheral portion of the pump shell 51b.

In this third embodiment, the entire transmission can be fabricated into a further smaller size than in the first and second embodiments and the axial dimension of the fluid coupling 12 is minimized.

What is claimed is:

1. A stepless speed-change power transmission for a vehicle having a fluid coupling, a drive plate for transmitting drive power from an engine to said fluid coupling a forward/backward change-over mechanism coupled to a rear stage of said fluid coupling, and a stepless speed changer coupled to a rear stage of the forward/backward change-over mechanism, wherein a clutch element for selectively coupling said drive plate with a pump wheel in said fluid coupling when the vehicle is operated to drive is installed between said drive plate transmitting power from an engine to said fluid coupling and the pump wheel of said fluid coupling;

said fluid coupling having a turbine wheel facing said pump wheel and interconnected through a turbine hub to an output shaft; and drive power from said fluid coupling is transmitted from said output shaft to said forward/backward change-over mechanism;

in which said clutch element comprises a piston on which a hydraulic force inside said fluid coupling acts, said piston having an inner peripheral portion slidable in an axial direction of said turbine hub, a facing secured to a face of said piston facing said drive plate, and a dog clutch on an outer peripheral portion of said piston coupling said piston to said pump wheel and permitting said piston to slide on said turbine hub.

2. A stepless speed-change power transmission for vehicle as set forth in claim 1, in which said piston slidable inner peripheral portion is formed into a cylindrical shape fitting onto an outer peripheral surface of said turbine hub, an oil seal and a bushing are interposed between said piston slidable inner peripheral portion and said turbine hub, and said piston is supported to slide axially of said turbine hub.

3. A stepless speed-change power transmission for vehicle as set forth in claim 1, in which said piston outer peripheral portion is bent toward a radially external side of said pump wheel, and said dog clutch is formed between the tip ends of said outer peripheral portion of said piston and the outer peripheral portion of said pump wheel.

4. A stepless speed-change power transmission for vehicle as set forth in claim 1, in which said fluid coupling is in a housing and an oil chamber for accumulating working oil is provided in said housing between said piston and said face of said drive plate said oil chamber being interconnected to an oil passage of an output shaft at the inside of said turbine hub.

5. A stepless speed-change power transmission as set forth in claim 1, in which a centrifugal lock-up clutch is provided on said turbine hub, and in which said centrifugal clutch is surrounded by the axial slidable piston forming said clutch element.

6. A stepless speed-change power transmission for vehicle having a fluid coupling having a housing, a drive plate on said housing for transmitting engine drive power to said coupling, a forward/backward change-over mechanism coupled to a rear stage of the fluid coupling, and a stepless speed-changer coupled to a rear stage of the forward/backward change-over mechanism;

wherein a clutch element, which selectively couples said drive plate with a pump wheel in said fluid coupling when a vehicle is operated to drive, is positioned between said drive plate transmitting power from an engine and said pump wheel of said fluid coupling;

a turbine wheel facing said pump wheel is interconnected through a turbine hub to an output shaft;

said clutch element comprising a piston to which a hydraulic force inside said fluid coupling acts;

said clutch element having an inner peripheral portion slidable in an axial direction of said turbine hub;

a facing secured to a face of the piston which faces the drive plate;

a drag clutch dog tooth is provided on an outer peripheral portion of the piston, which dog tooth couples to the pump wheel so as to permit the piston to slide on said turbine hub;

said piston inner peripheral portion being formed into a cylindrical shape fitting onto an outer peripheral surface of the turbine hub;

an oil seal and a bushing are interposed between the piston inner peripheral portion and the turbine hub;

the piston is so supported as to slide axially in relation to the turbine hub;

said piston outer peripheral portion being so formed as to be bent toward a radially external side of the pump wheel;

said dog tooth being formed at a tip end of the outer peripheral portion;

an oil chamber for accumulating working oil is provided between said piston and an input portion of an external shell element forming a cover of the fluid coupling; and this oil chamber is interconnected to an oil passage of an output shaft inserted through an inside of the turbine hub.

* * * * *